(12) United States Patent
Schmidt

(10) Patent No.: US 11,565,642 B2
(45) Date of Patent: Jan. 31, 2023

(54) SUCTION-BASED DOOR PROTECTION DEVICE

(71) Applicant: Randal Schmidt, Prosper, TX (US)

(72) Inventor: Randal Schmidt, Prosper, TX (US)

(73) Assignee: Randal Schmidt, Prosper, TX (US)

( * ) Notice: Subject to any disclaimer, the term of this patent is extended or adjusted under 35 U.S.C. 154(b) by 120 days.

(21) Appl. No.: 17/140,960

(22) Filed: Jan. 4, 2021

(65) Prior Publication Data

US 2021/0206331 A1  Jul. 8, 2021

Related U.S. Application Data

(60) Provisional application No. 62/956,919, filed on Jan. 3, 2020.

(51) Int. Cl.
| | |
|---|---|
| *B60R 19/42* | (2006.01) |
| *B60R 13/04* | (2006.01) |
| *B60J 5/04* | (2006.01) |
| *B60R 11/00* | (2006.01) |

(52) U.S. Cl.
CPC .............. *B60R 19/42* (2013.01); *B60R 13/04* (2013.01); *B60J 5/0468* (2013.01); *B60J 5/0493* (2013.01); *B60R 2011/004* (2013.01); *B60R 2011/0056* (2013.01)

(58) Field of Classification Search
CPC .. B60R 13/04; B60R 2011/0056; B60R 19/42
USPC ....................................................... 293/128
See application file for complete search history.

(56) References Cited

U.S. PATENT DOCUMENTS

| | | | | |
|---|---|---|---|---|
| 4,707,008 A | * | 11/1987 | Falco ...................... | B60R 13/04 52/716.5 |
| 4,828,303 A | * | 5/1989 | Soria ...................... | B60R 13/04 248/206.3 |
| 4,844,395 A | * | 7/1989 | Perentin .................... | A47F 7/19 248/205.8 |
| 5,050,925 A | * | 9/1991 | Brown ..................... | B60J 11/06 296/136.03 |
| 5,312,145 A | * | 5/1994 | McNeil ................... | B60J 11/06 293/126 |
| 5,320,392 A | * | 6/1994 | Hart ........................ | B60R 13/04 293/120 |
| 5,984,401 A | * | 11/1999 | Hannah .................... | B60J 11/00 248/205.9 |

(Continued)

*Primary Examiner* — Jason S Morrow
(74) *Attorney, Agent, or Firm* — Merchant & Gould, P.C.

(57) ABSTRACT

A removable vehicle exterior door guard device comprising an elongate panel and a plurality of vacuum seal suction cups. The panel can comprise a foam pad or other flexible polymer coupled to one or more suction cups configured to hold the panel to a vehicle surface. The device can comprise a foam pad having suction cups configured to provide a vacuum seal to a vehicle exterior door, for example using screw-tightening suction cup mechanism or a lever tightening suction cup mechanism. The vacuum seal suction cups are configured to maintain a strong seal against the vehicle surface over extended periods of time, even if the panel is bumped or the vehicle surface is not clean. The device can additionally include a theft deterrent system comprising a cord attached at a proximate end to the panel and at a distal end to an anchor that is secured inside the vehicle.

20 Claims, 11 Drawing Sheets

(56) References Cited

U.S. PATENT DOCUMENTS

| | | | | |
|---|---|---|---|---|
| 7,229,059 | B1* | 6/2007 | Hood | F16M 13/022 |
| | | | | 248/205.8 |
| 7,374,214 | B2* | 5/2008 | Debs | B60R 19/42 |
| | | | | 293/128 |
| 7,527,320 | B1* | 5/2009 | Nevell, Jr. | B60R 19/445 |
| | | | | 293/128 |
| 8,356,781 | B2* | 1/2013 | Chen | F16B 47/006 |
| | | | | 248/205.8 |
| 9,695,974 | B2* | 7/2017 | Gordon | A45D 44/14 |
| 9,862,258 | B2* | 1/2018 | Schmidt | B60R 19/42 |
| 2006/0220400 | A1* | 10/2006 | Diamond | B60R 19/42 |
| | | | | 293/126 |
| 2007/0158963 | A1* | 7/2007 | Debs | B60R 19/42 |
| | | | | 293/128 |
| 2009/0026776 | A1* | 1/2009 | Simmons | B60R 19/42 |
| | | | | 293/128 |
| 2011/0297716 | A1* | 12/2011 | Mo | F16B 47/006 |
| | | | | 224/559 |
| 2014/0183238 | A1* | 7/2014 | Lin | F16M 11/2078 |
| | | | | 224/483 |

* cited by examiner

SUCTION-BASED DOOR PROTECTION DEVICE

TECHNICAL FIELD

Embodiments claimed herein relate to elements for protection of the body-finishing of vehicles, and more particularly to ornamental or guard strips such as door strip guards. In embodiments, removable vehicle exterior guards for a vehicle's door or side panels can provide unique and broad protection of the vehicle exterior from damage incurred by impact from other objects, including, for example, the doors of adjacent vehicles.

BACKGROUND

Vehicle exteriors are vulnerable to damage caused by impact from other vehicles parking alongside and opening doors while parties enter or exit their vehicles. Vehicles may also be damaged by impact from other objects such as bikes or shopping carts. The risk of damage is compounded by crowded parking lots, narrow or angled parking spaces, and differences between vehicle types and sizes, such as minivans, trucks, and sport utility vehicles, all with a variety of protruding shapes of the vehicle's door design.

Conventional vehicle manufacturers provide minimal protective solutions, generally consisting of narrow sidestrip molding on some automobiles, while many manufacturers provide no exterior molding protection. Conventional aftermarket side-exterior vehicle protection devices include a variety of molding strips, elongated tubing, or pads comprised of plastics, foam, or rubber materials. These conventional devices fail to sufficiently protect vehicles from damage, and can be bulky and difficult to store and handle.

For example, a conventional molding strip may be formed to cover the furthest outward point of a particular vehicle's doors. However, adjacent vehicles often have different contours, and the furthest outward point of those adjacent vehicles could be relatively higher or lower, precluding protection offered by the molding strip. Additionally, conventional molding strips are often permanently affixed to the vehicles, making reorientation to better protect against a particular adjacent vehicle impossible. Such conventional strips or pads, therefore, may be lightweight and easy to handle, but provide insufficient coverage to the protected vehicle.

Some conventional aftermarket devices have large dimensions, covering the width and length of the vehicle's side panels and significant portion of the doors. These devices provide more protection than the lightweight molding strips, but are burdensome to handle and manage. Their size often makes storage in the vehicle when the device is not in use difficult. Aftermarket devices can also be difficult to attach to and remove from the vehicle. For example, they may use hooks, spring-loaded clips or strapping to adhere to the vehicle, which often require a great deal of effort to properly attach. Moreover, these mechanisms often come unattached from the vehicle after a short time, or after a single impact. Both lightweight and bulkier versions of conventional aftermarket door protection devices suffer from poor coverage of the various protruding points of different vehicle makes and models. This is compounded by the wide variety of vehicle types, parking angles and positioning inherently present in parking lots.

Other conventional aftermarket devices incorporate magnets to attach to the vehicle. Increasingly, vehicles are manufactured with aluminum or carbon fiber body parts that magnetic vehicle protection devices will not adhere to. Many magnetic vehicle protection devices can also be difficult to remove due to the necessary strength of the magnetic attraction.

Although these problems have been recognized, limited solutions have been provided. Several of these devices must also be constructed in a customized fashion as previously described in order to fit an intended vehicle and use, increasing production costs. Conventional devices are typically either permanently adhered, as described above, or alternatively rely on either magnetic attachment, attachment to a fixed physical structure with mechanical clips or cleats, or suction-based. Each of these comes with a corresponding tradeoff.

For example, U.S. Pat. No. 4,828,303 ("Soria") discloses a telescopic elongate bar assembly for adjusting the length of the apparatus for mounting on any size of vehicle. The bar assembly includes slideable suction cups for connecting the apparatus to a vehicle. A rubber strap having a bar at one end is attached at the other end to the rubber coating on the largest telescopic bar. With all the sliding and adjustable elements in Soria, attaching the device to the vehicle is an awkward and time-consuming task.

US Patent Application No. 2005/0099026 ("Velazquez") uses both mechanical attachment (i.e., clips) and suction cups. Velazquez describes the deficiencies of Soria in the background, and goes on to describe an elongated tubular PVC bar having a length that coincides with the width of a vehicle's door or door and fender. Therefore, the Velazquez device must be specially manufactured for each particular make and model of vehicle, increasing costs. A significant disadvantage is that the tubular PVC bar can be awkward to handle when attaching and detaching from the vehicle, difficult to store when not in use, and significantly limits the range of protection offered in areas where scratches and dents commonly occur. Velazquez discloses attaching the device to a vehicle using mechanical means in conjunction with multiple suction cups, to ensure that the device remains fixed to the vehicle during use.

US Patent Application No. 2006/0097528 ("Southerland") provides some reasoning for the inclusion of multiple suction cups—each one is unable to hold much weight. Southerland discloses an automotive dent guard comprising panels molded of translucent vinyl that are secured by slip clips and suction cups. Because the suction cups of Southerland are unable to hold the guard panel to the vehicle on their own, the slip clips are also required to ensure that the door guard remains in position on the vehicle. Attaching the slip clips and suction cups to the vehicle makes the Southerland device burdensome to handle and time-consuming to attach.

PCT Application No. WO 2006/087483 ("Morin-Docter") discloses a cellular foam plate lined with plastic that may be secured on a vehicle using four or five conventional suction cups. However, Morin-Docter's description admits that these conventional suction cups are subject to reduced performance when the vehicle is not perfectly clean and smooth. For example, the Morin-Docter device does not reliably adhere to the vehicle when there is dust on the vehicle.

Overall, mechanical connectors using magnets or clips may cause damage to the very same vehicle they are designed to protect, particularly when dirt or other foreign objects are present on the vehicle. Applicant's own prior invention, U.S. Pat. No. 9,862,258, relies on magnetic attachment to overcome these deficiencies. Magnetic attachment may not be appropriate for all vehicles, however, such as those made of non-magnetic material that are becoming more prevalent.

SUMMARY

Devices described herein solve the problem posed by the background devices that incorporate conventional fastening mechanisms by utilizing locking, vacuum-seal suction cups. The combined components of embodiments described herein are comprised of high-density, lightweight protective materials with locking, vacuum-seal suction cups that may be securely compressed via an integrated system of polymeric (e.g. nylon) and hi-density foam washers affixed to front and/or back of the device's protective panel. Some embodiments use lever tightening to facilitate uniform application of increased pressure on the vacuum seal cup. Embodiments of this device provide concentrated compression of the suction cups for extended periods of time, a solution that has not been used before. These individual components are unique and cohesively engineered in a manner not previously recognized in the art.

According to embodiments, the device described and claimed herein provides unique and broad protective coverage that can be used nearly universally on vehicles, regardless of the make and model or whether the vehicle is made of magnetic material. In embodiments, an impact-resistant, flexible, firm-holding, and removable vehicle exterior guard apparatus is described. Embodiments are both convenient to use and store when not in use, and also provide ample coverage of the areas to be protected. Furthermore, in embodiments a theft-deterrent system can be incorporated that prevents the device from being taken from the vehicle while in use, but is not burdensome to the user to engage or disengage.

In embodiments, a removable vehicle exterior guard device can comprise an elongate panel having a back side and a front side, and the back side can be adapted to contact the body of a vehicle when installed. The panel can comprise a foam pad comprising a flexible polymer, a front foam pad attached to the front side of the foam pad and running the length of the foam pad, and one or more suction cups attached to the panel capable of contacting the body of the vehicle. For example, an embodiment of the vehicle protection panel weighs less than 1 pound and contains three vacuum-seal, locking suction cups that ensure optimal long term hold to vehicles in all weather conditions, despite dust buildup or disruption of the panel by another person, object or adjacent door.

In embodiments, the removable vehicle exterior guard device can also include a theft protection system comprising a cord fixedly attached to the panel at a proximate end and an anchor fixedly attached to the cord at a distal end. The anchor can be sized and shaped such that it can prevent the panel from being removed from the vehicle when the vehicle door is closed. In embodiments, the anchor can be ring shaped.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
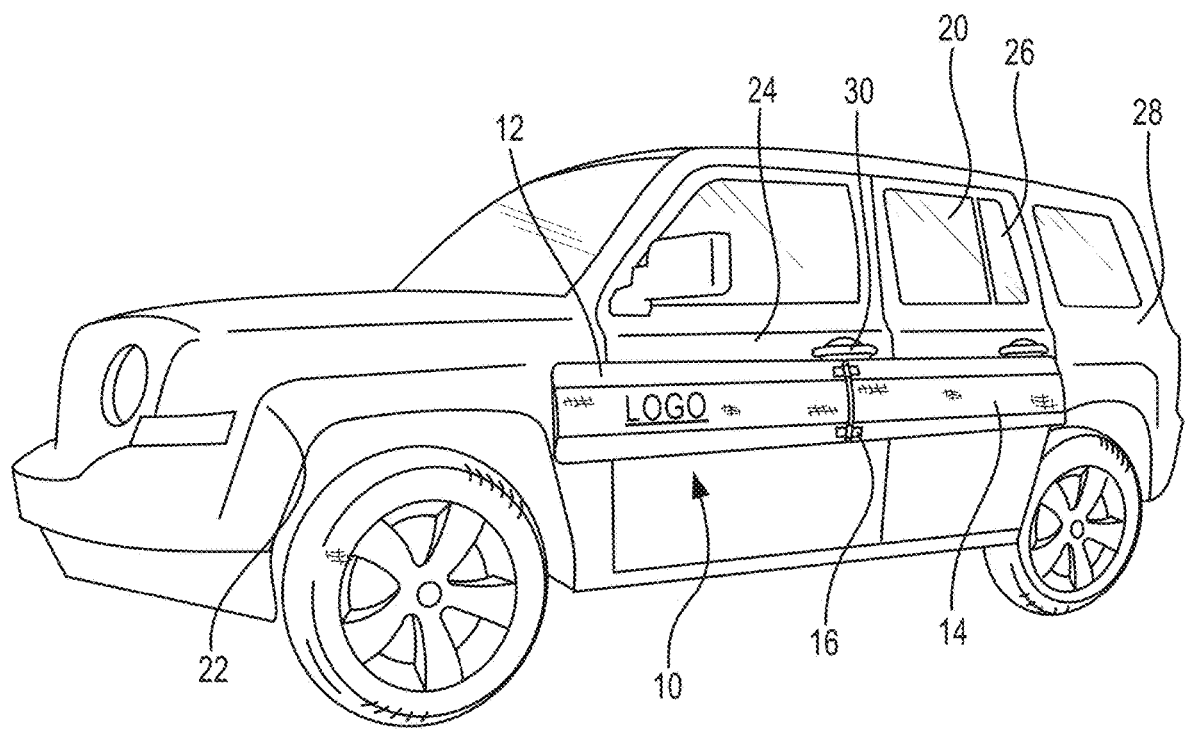
FIG. 1 is a perspective view of a panel attached to a vehicle according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

This invention recognizes two interrelated problems. First, magnetic door protection systems are incompatible with aluminum, carbon fiber, polymer, or other non-magnetic vehicle components. Second, the use of conventional suction cups to adhere door dent protection devices to a vehicle is lacking. I have discovered the previously unrecognized and unresolved problem that conventional suction cups do not provide a vacuum-seal locking component that will seal and hold the cups to surfaces over an extended period of time, causing the cups to fail and drop off the vehicle surface. This is compounded by both the curve of the vehicle's surface and any weight of the protection device that these suction cups are attempting to support. Additionally, I have discovered that conventional suction cups offer decreased hold time in cold weather or weather conditions with strong winds that enter the backside of a protection panel. Conventional suction cups can also fail if dust or moisture builds up on the vehicle's surface, or if the panel is bumped or disrupted by another object, such as a person or adjacent door.

Furthermore, regardless of the number of conventional suction cups used on any door dent protection device, the device does not offer consistent protection for extended periods of time. As individual suction cups used in such devices loosen or fail, the device to drops off the vehicle surface, rendering it useless. Notably, protection devices using conventional suction cups do not disclose or report any definitive guarantee or test studies of the length of time the device can be expected to remain in place.

Door dent protection devices typically vary in weight from one half pound to 3 pounds. However, even if equipped with multiple conventional suction cups, such as four per panel, these cups will not adhere for necessary and expected periods of time when parking a vehicle. The duration of conventional suction cup performance is especially ineffectual when door dent protection devices are left for long periods, such as parking at airport lots or during transport of new vehicles to dealerships. Vehicle protection devices using conventional suction cups are unable to accurately provide any definitive guarantee of the length of time the device will be expected to remain in place.

As such, there is a need in the industry for a device that is capable of protecting an entire vehicle side panel and/or door(s), in a variety of settings and uses. Ideally, this device could be reliably secured to the vehicle using suction cups that will not fall victim to the inadequacy of conventional suction cups. These suction cups would adhere to the vehicle despite curvature, cleanliness, weather conditions, or disruption from passing objects. The device would continue to adhere to the vehicle over extended periods of time, providing improved performance and reliability over existing door guard systems and devices. The device should be a reasonable size and shape for a lone person to use, without being overly cumbersome. Finally, such systems would desirably incorporate theft-deterrence systems, without making the system slow or unwieldy to use.

According to embodiments described herein, an improved vehicle exterior protection apparatus is easily installable and removable, and provides effective protection from impacts to vehicle exterior from other vehicle doors and objects while parked. The panel dimensions facilitate use on various vehicles of different sizes and shapes, including automobiles, trucks, and SUVs, with optimal and broader coverage than conventional vehicle impact-protection devices. The panels described herein can be constructed in a manner that provides a double-layered and conveniently slim impact-protective solution.

According to embodiments, a protector device has a width and length configured to comprehensively cover the exposed areas on sides of one and two-door cars, SUVs and trucks. The area covered by the protector can extend from front wheel-well vicinity to rear wheel-wheel vicinity of any particular vehicle. This device can be moved to a different portion of the vehicle, or applied to a different vehicle, for optimal protection according to the potential exposure to door-dents and scratches within the given parking space. Embodiments of the device described herein can be folded, rolled, or otherwise broken down or compressed to be stored easily when not in use. Embodiments can incorporate an anti-theft device including a string, wire, or cable having an object attached at the end remote from the remainder of the device.

FIG. 1 is a perspective view of a panel 10 according to an embodiment, wherein the panel 10 is attached to a vehicle 20. As shown in FIG. 1, the panel 10 includes a fore portion 12 and an aft portion 14. The panel 10 can be attached to any portion of the vehicle 20, thereby protecting various parts of the vehicle 20 based on the particular risks presented, such as when the vehicle 20 is left in a parking lot where other vehicles may be coming and going. Parts of the vehicle 20 that are particularly susceptible to damage include the fore fender 22, the front door 24, the back door 26, the rear fender 28, and the door handle 30, each of which can be at least partially covered by the panel 10.

Figure 2:
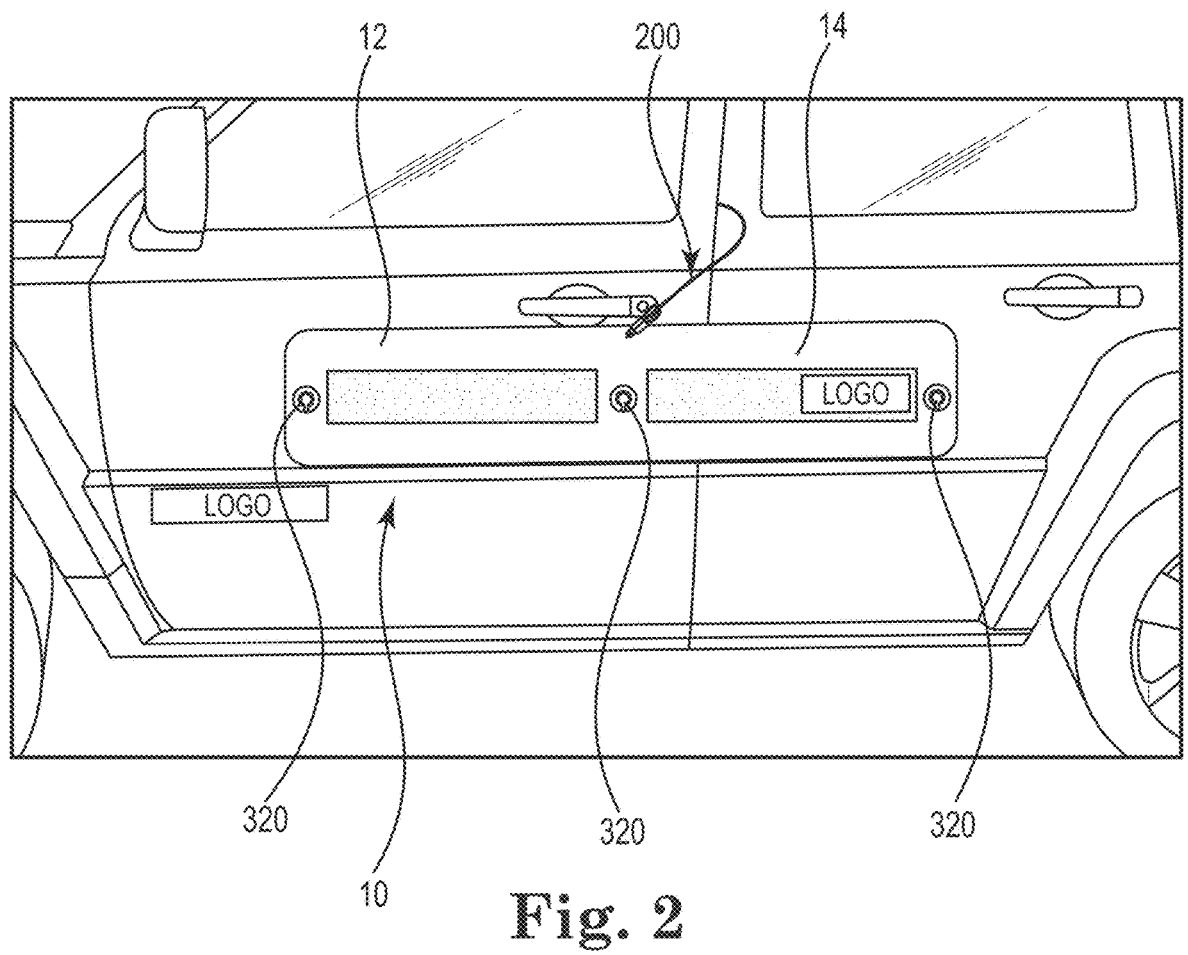
FIG. 2 is a perspective view of a panel attached to a vehicle according to an embodiment.
Figure 5:
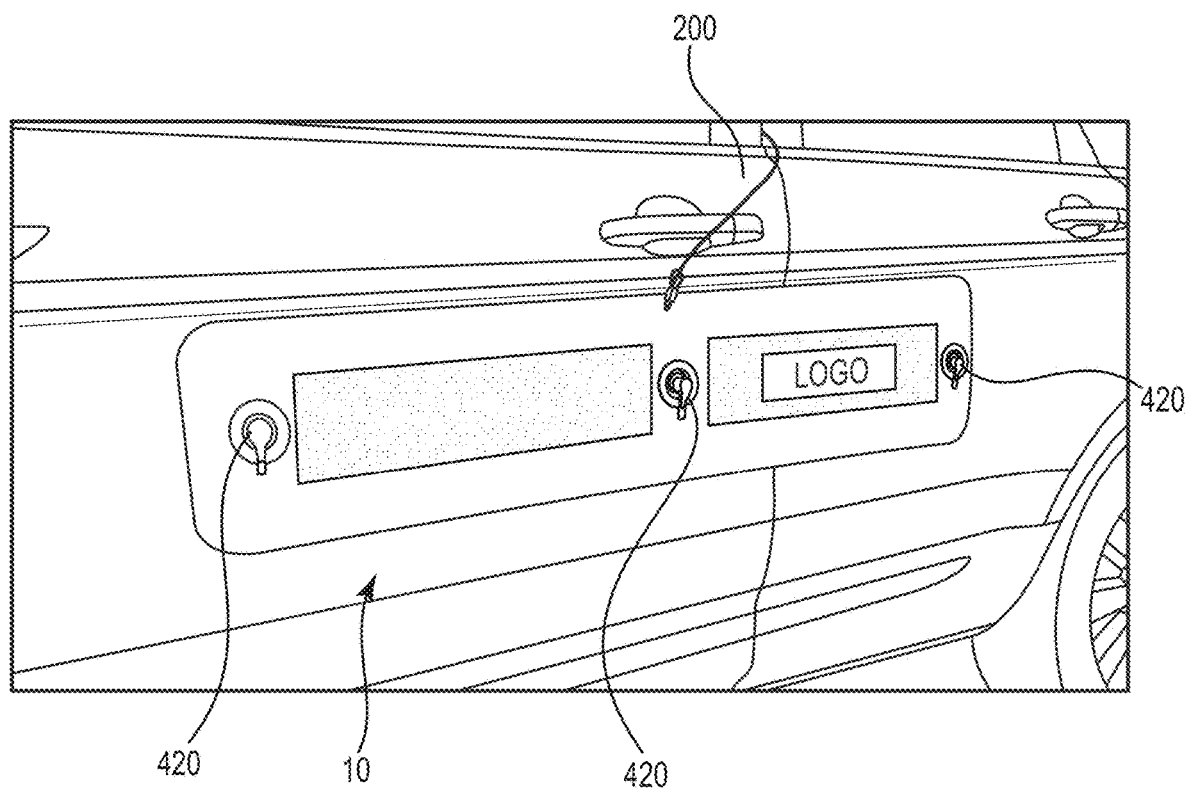
FIG. 5 is a perspective view of a panel attached to a vehicle according to the embodiment shown in FIG. 4.

FIGS. 2 and 5 provide perspective views of the panel 10 according to embodiments, wherein the panel 10 is attached to a vehicle. As shown in FIG. 2, the panel 10 comprises a plurality of screw tightening suction cups 320 arranged along a fore portion 12 and an aft portion 14, and a security device 200. FIG. 5 provides an alternative embodiment, showing the panel 10 having a plurality of lever tightening suction cups 420 and a security device 200.

The panel 10 may be formed of any suitably durable, lightweight material. For example, the panel 10 may comprise a suitably sized, rectangular body constructed of one or more lightweight, impact-resistant, flexible plastic or foam materials. The panel 10 may also be constructed of other materials such as rubber, or comprise a rounded or alternatively shaped body. In some embodiments, the fore portion 12 may be constructed of different materials than the aft portion 14. Embodiments of the panel 10 may also be adapted such that fore portion 12 can be folded or otherwise collapsed around aft portion 14 when panel 10 is not in use. In alternative embodiments, the fore portion 12 and aft portion 14 can be a single flexible piece, such that the panel 10 can be rolled into a tube or otherwise folded during storage. In one embodiment, the panel 10 may have a length of about 46 inches. In one embodiment, the panel 10 may have a height of about 8 inches.

The suction cups ensure long-term, vacuum seal attachment of the panel 10 to the vehicle. A vacuum seal is maintained by a mechanical lock to prevent loss of suction. The mechanical lock can be easily engaged and disengaged by hand, for example using a hand tightening screw mechanism 320 (see, e.g., FIGS. 2-3) or a lever mechanism 420 (see, e.g., FIGS. 4-7.) The mechanical lock ensures that the suction cups retain a firm, long-term hold to the vehicle despite dust buildup, weather conditions, or disruption of the panel 10 by another person, object, or adjacent door. The precise number and arrangement of the suction cups along the fore portion 12 and the aft portion 14 may be based on the dimensions of panel 10, or based on the portion of the vehicle being protected.

For example, the panel 10 may include three screw tightening vacuum-seal, locking suction cups 320 dispersed at approximately equal intervals along the panel 10. As shown in FIG. 2, embodiments of the panel 10 may be long enough to provide protection to both the front and rear door of the vehicle, and reliably secured via the screw tightening suction cups 320. In alternative embodiments, the panel 10 may be smaller or larger, configured to protect a different area of the vehicle, or for use on a vehicle having alternative dimensions. In these embodiments, the panel 10 may also include a different number or configuration of screw tightening suction cups 320, based on the particular size or shape of panel 10.

The security device 200 prevents the panel 10 from being stolen. For example, one end of the security device 200 may be attached to the panel 10, and the opposite end may be secured inside the vehicle. Further description of an embodiment of the security device 200 is provided below, with reference to FIGS. 8-10.

Figure 3:
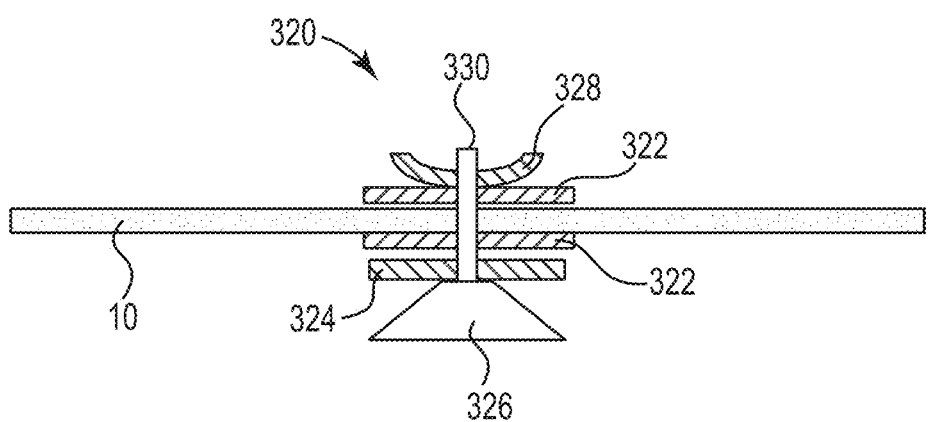
FIG. 3 is a front elevation view of a panel having a screw tightening suction cup according to the embodiment shown in FIG. 2.

FIG. 3 provides more detail about the configuration of screw tightening suction cups 320 according to an embodiment. As shown, the screw tightening suction cups 320 generally comprise a first washer 322, a second washer 324, a twist seal grip 328, a gib 330, and a vacuum seal cup 326. According to this embodiment, screw tightening suction cup 320 may include two washers 322, positioned on either side of panel 10. In the embodiment shown in FIG. 3, the first washers 322 can be made of nylon, while the second washer 324 may be made of a foam material, such as a high-density foamed polymer that will provide impact resistance through compressibility. In embodiments, the foam material can be light weight for easy handling by a user, and durable in various weather conditions by providing resistance to heat, cold, rain, and mildew, among other environmental factors. In one embodiment the foam may be a high-density ethylene vinyl acetate (EVA) or another closed-cell foam. The foam density should be high enough to facilitate handlability and protection. The washers 322 are formed of nylon in one embodiment, but in alternative embodiments could be formed of any compressive material capable of providing compressive support to the screw tightening suction cup 320. The foam washer 324 may be positioned between the suction cup 326 and one of the nylon washers 322. The foam washer 324 may also be formed of any suitably compressive material capable of providing additional pressure and support to the screw tightening suction cup 320.

The twist-seal grip 328 may be positioned adjacent to the second nylon washer 322, coupled to the vacuum seal cup 326 via a gib 330. For example, the gib 330 may extend through twist-seal grip 328, a first nylon washer 322, panel 10, and a second nylon washer 322 to the vacuum seal cup 326. The gib 330 generally has a screw-threaded pattern that permits the twist-seal grip 328 to be moved up and down along the length of the gib 330 to respectively loosen and tighten the mechanical lock of the screw tightening suction cup 320. The twist-seal grip 328 can therefore be used to easily attach and detach the panel 10 from the vehicle by hand. For example, moving the twist-seal grip 328 down along the length of the gib 330 increases the pressure on the vacuum seal cup 326 to seal the cup 326 to a surface. The twist-seal grip 328 remains in the lowered position, continuing to compress the cup 326 until the twist seal grip 328 is moved back up the length of the gib 330. This mechanical lock ensures that the panel 10 remains firmly sealed to the surface of the vehicle during the desired duration of protection.

The screw tightening embodiments include a foam washer 324 arranged between the cup 326 and the panel 10. Elasticity of the washer pushes against the cup 326 to maintain the vacuum seal in the cup 326. In embodiments, the washers 322 may not be required on the "back side" of the panel 10 (i.e., the side closer to the washer 326).

Screw tightening suction cup 320 includes an integrated system of nylon and hi-density foam washers 322, 324 affixed to front and/or back of the device's protective foam panel 10 to ensure that the screw tightening suction cups 320 may be securely compressed. Alternative embodiments may comprise alternative numbers and configurations of nylon washers 322 and foam washer 324. The nylon washers 322 and the foam washer 324 are configured to enhance the compression of the suction cup 326, ensuring the panel 10 is held firmly to the vehicle surface over extended periods of time.

FIGS. 4-7 show an alternative embodiment of the panel 10 that includes a plurality of lever tightening suction cups 420. The configuration and construction of the lever tightening suction cups 420 is generally similar to the configuration and construction of the screw tightening suction cups 320 discussed above, except for the mechanical lock mechanism for the vacuum seal that holds panel 10 to a vehicle. For example, the foam washer 324 is not required in the embodiment shown in FIGS. 4-7 because lever tightening facilitates the application of increased pressure that is more uniformly applied on the vacuum seal cup 426, compared to screw tightening embodiments as shown in FIGS. 2 and 3.

The lever tightening suction cups generally best ensures that the suction cups retain a firm, long-term hold to the vehicle. Threaded stem and nut configurations used in suction based systems serve only to adhere the device to the suction cups. Without added pressure via a component of same diameter, such as the foam or vinyl washers, against the suction cup for tightened force, the tightened nut will not create a vacuum seal. Therefore, screw-down suction cup systems require enhanced compression centered on the suction cup. The lever tightening embodiment of suction cups, as shown in FIGS. 4-7, provide sustained compression without this requirement. Additionally, the lever tightening suction cups reduce the potential for user-error with hand-tightening.

Figure 4:
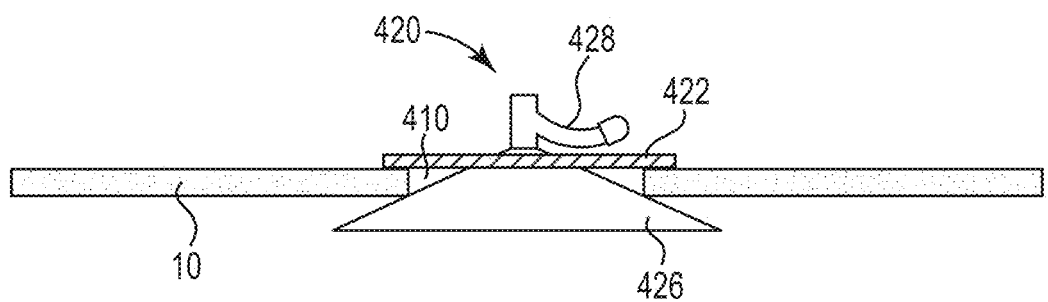
FIG. 4 is a front elevation view of a panel having a plurality of lever tightening suction cups according to an embodiment.

As shown in FIG. 4, the panel 10 may generally comprise a vacuum seal cup 426 extending through a hole 410 through the panel 10, a nylon washer 422 placed over the hole 410 opposite the panel 10 from the cup 426, and a lever tightening suction cup mechanism 420.

The lever tightening suction cup 420 optionally includes an integrated system of nylon and hi-density foam washers 422 affixed to front and/or back of the device's protective foam panel 10 to ensure that the lever tightening suction cups 420 may be securely compressed. Like the washer 322, the washer 422 provides compressive force that optimizes the long-term stability of panel 10 on a vehicle. Alternative embodiments may include additional washers 422, constructed of nylon, foam, or any other suitably compressible material, as discussed above with reference to FIG. 3. In some embodiments, the washer 422 or another layer of material may be included for purely aesthetic reasons, for example to cover the hole 410. In alternative embodiments, the washers 422 may provide additional compressive force to the lever tightening suction cup mechanism 420, strengthening the vacuum seal against the surface of the vehicle or other surface to be protected.

FIG. 5 provides a perspective view of the panel 10 comprising a plurality of lever tightening suction cup mechanisms 420 and a security device 200. As discussed above, the precise number and configuration of the lever tightening suction cups 420 along the body of the panel 10 may depend on the exact dimensions of the panel 10, as discussed above. Additionally, the panel 10 may be smaller or larger than shown, depending on the portion of the vehicle being protected or other consumer demands. For example, the panel 10 may be constructed of a single piece of high-density foamed polymer with a length of about 46 inches. The high-density foamed polymer will provide impact resistance through compressibility, while also providing the flexibility to contour the sides of a vehicle. In embodiments, the foam material can be light weight for easy handling by a user, and durable in various weather conditions by providing resistance to heat, cold, rain, and mildew, among other environmental factors. The foam material may also be flexible enough to permit the panel 10 to be folded or rolled into a tube during storage. In one embodiment the foam may be a high-density ethylene vinyl acetate (EVA) or another closed-cell foam. The foam density should be high enough to facilitate handlability and protection.

Figure 6:
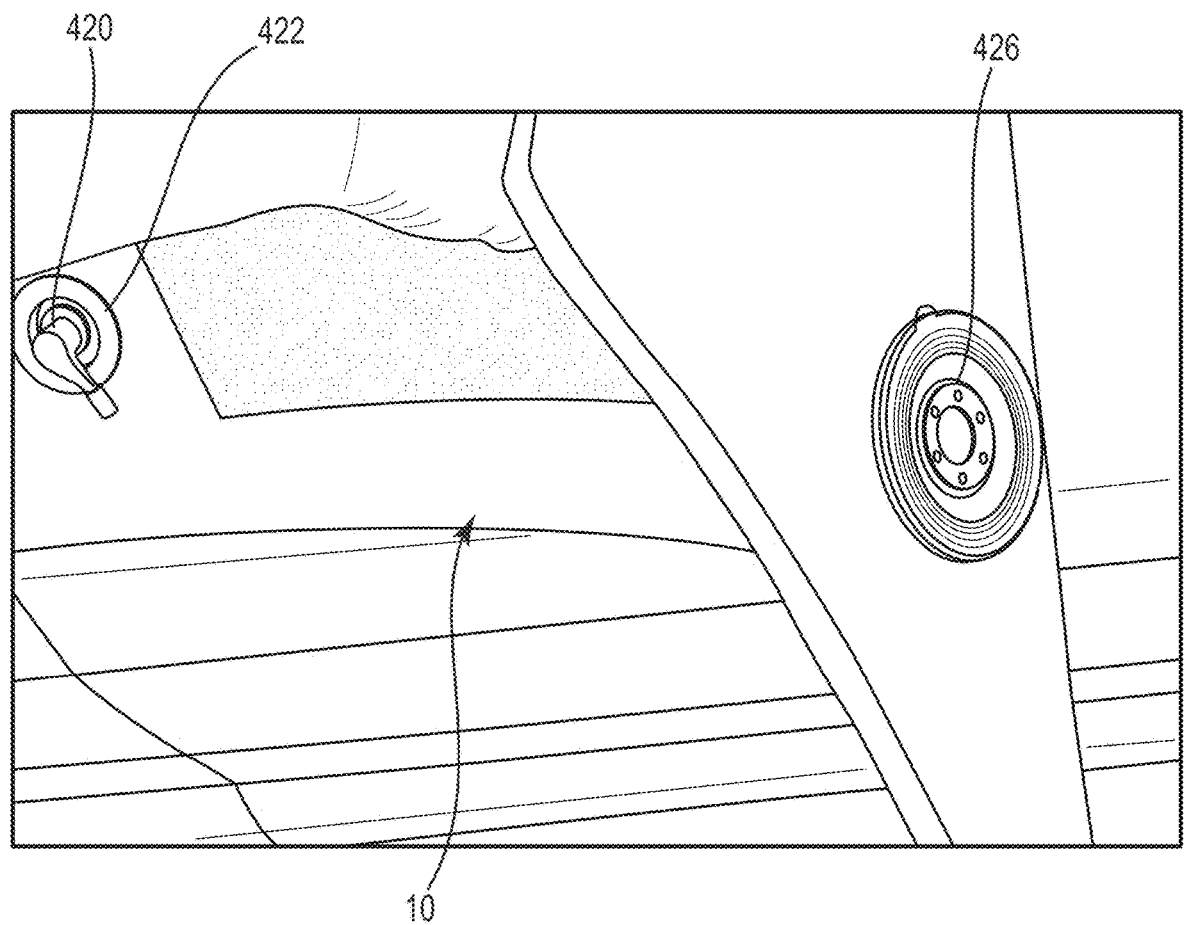
FIG. 6 is a cutaway perspective view of a panel partially attached to a vehicle according to the embodiment shown in FIG. 4.

FIG. 6 provides a perspective view of the panel 10 according to the embodiment shown in FIG. 5. As shown, the panel 10 is constructed of a flexible material and includes a plurality of lever tightening suction cup mechanisms 420 that are arranged along the length of the panel 10. The washer 422 may optionally be placed on the front side of the panel 10, proximate the push lever 428 to cover the hole 410. The vacuum seal cup 426 is on the back side of the panel 10, and operably engaged with the push lever 428.

Figure 7:
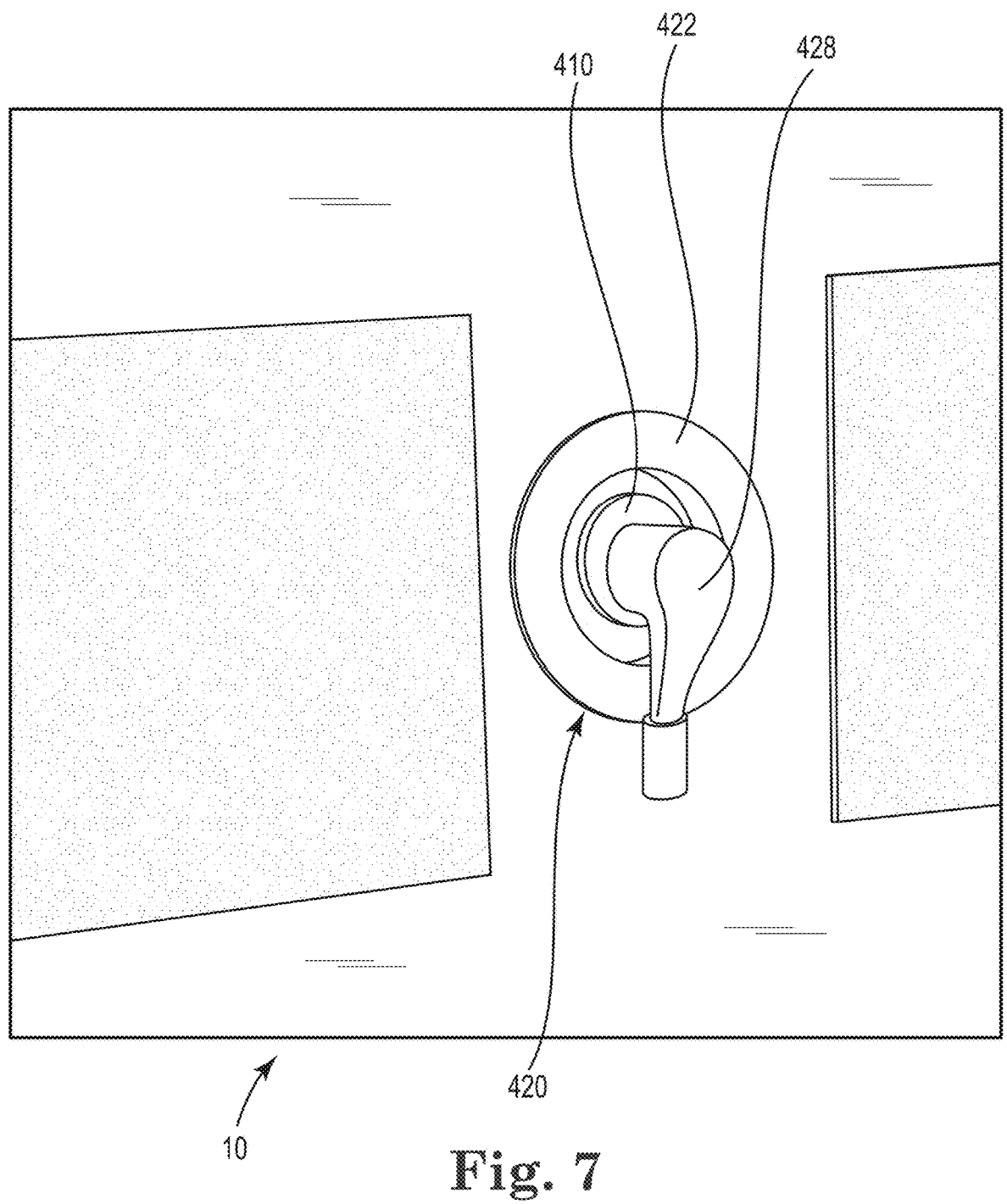
FIG. 7 is a detail view of a panel attached to a vehicle according to the embodiment shown in FIG. 4.

FIG. 7 provides a close-up view of the vacuum seal suction cup mechanism 420. The mechanism creates a vacuum seal between the cup 426 and the surface of the vehicle when the push lever 428 is moved into a locked position. For example, the push lever 428 may be pushed down toward the panel 10, increasing the pressure on the vacuum seal cup 426 to seal the cup 426 to the surface. The push lever 428 remains in this position, retaining the vacuum seal against the vehicle, until the push lever 428 is released, for example by pulling the push lever 428 up away from the panel 10. This mechanical lock ensures that the panel 10 remains firmly sealed to the surface of the vehicle during the desired duration of protection. Testing was performed to compare the performance of conventional suction cups with the improved performance of the vacuum-seal, locking suction cup mechanism 420, 320. Experimental tests found that a conventional suction cup could adhere to a smooth, clean, flat shower tile for an average of 72 hours, if the suction cup was neither disturbed nor bearing weight. When the same conventional suction cup was placed onto the side of a clean vehicle surface having a slightly curved surface, the conventional suction cup was able to retain a seal for an average of 35 minutes, if the suction cup was neither disturbed nor bearing weight.

On the other hand, experimental tests found that use of a single vacuum-seal, locking suction cup mechanism 420, 320 with the panel 10 could hold firmly to the slightly curved contour of a vehicle surface for indefinite periods of time and would not fail to retain a firm hold. For example, one test was conducted for a period of three consecutive weeks, during which the vacuum-seal, locking suction cups 326, 426 remained in firmly sealed to the surface of the vehicle, reliably keeping the panel 10 in place. Experimental test methods and results are summarized in the Test Data section below.

Figure 8A:
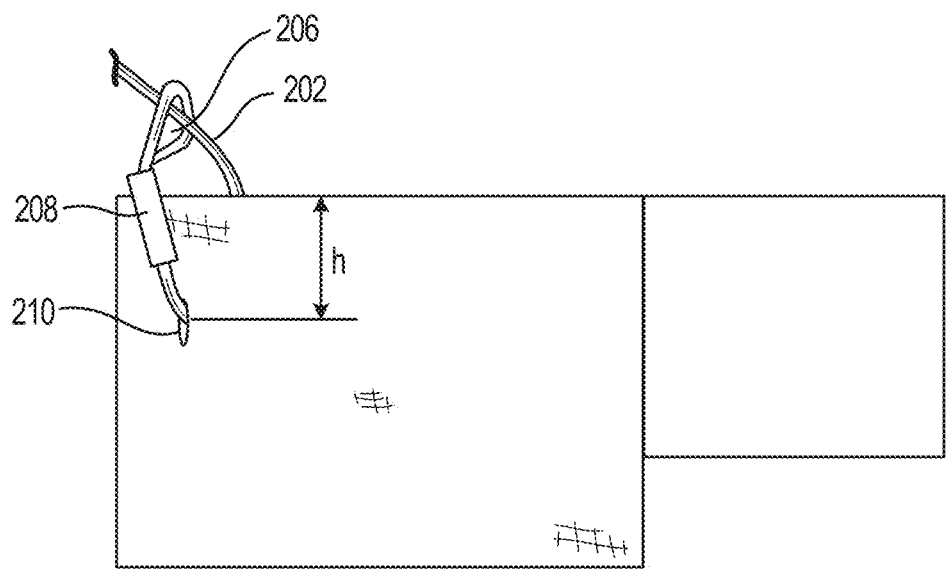
FIG. 8A is a cutaway perspective view of a security mechanism according to an embodiment.
Figure 8B:
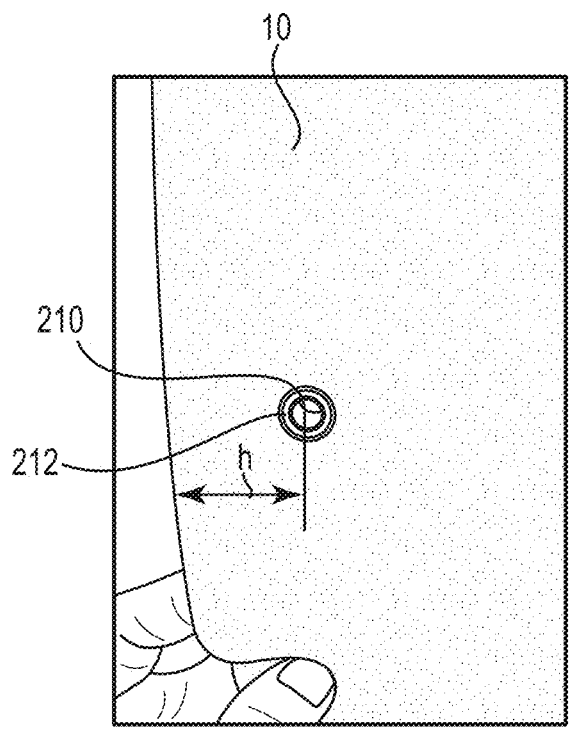
FIG. 8B is a cutaway perspective view of a security mechanism according to an embodiment.

FIG. 8A is a cutaway view of the engagement between the security feature 200 and the panel 10. A cable 202 loops through a hole 210 positioned at height h from the edge of the panel 10. As shown in FIG. 8B, the security feature 200 may include a grommet 212 that prevents damage to the hole 210 via wear and tear or tampering. The cable 202 is arranged in a loop 206 which returns to a crimp 208. In alternative embodiments, other fasteners or arrangements could be used to position the cable 202 to the panel 10, or to prevent wear and tear or tampering.

Figure 9A:
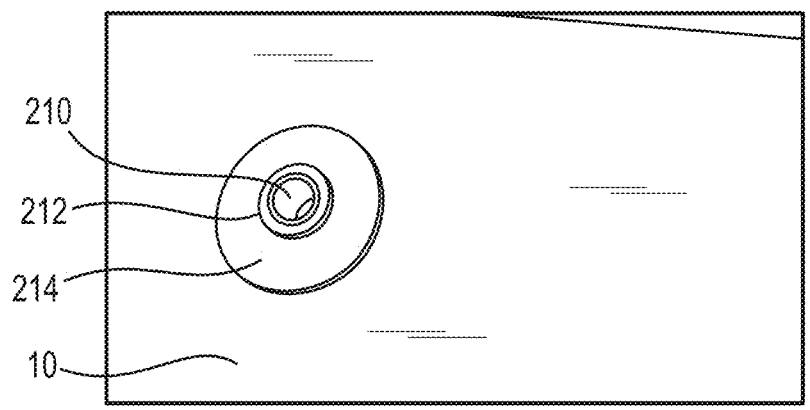
FIG. 9A is a cutaway back perspective view of a security mechanism according to the embodiment shown in FIGS. 8A and B.

FIG. 9A provides a close-up view of the back side of panel 10, showing the security feature 200 including a grommet 212 around the hole 210. As shown, the grommet 212 can extend through the hole 210 in the panel 10. Grommet 212 may be constructed of any hard, non-flexible material, such as plastic, silicone, or metals, that can ensure the size of the hole is not altered by wear and tear or tampering. A washer 214 may also be coupled to the grommet 212 adjacent the back side of the panel 10. The washer 214 may be provide added strength and stability to the grommet 212, for example being large enough to prevent the grommet 212 from being pulled through the hole 210. The washer 214 may be constructed of any suitably rigid, durable material, such as metals, plastics, or silicones.

Figure 9B:
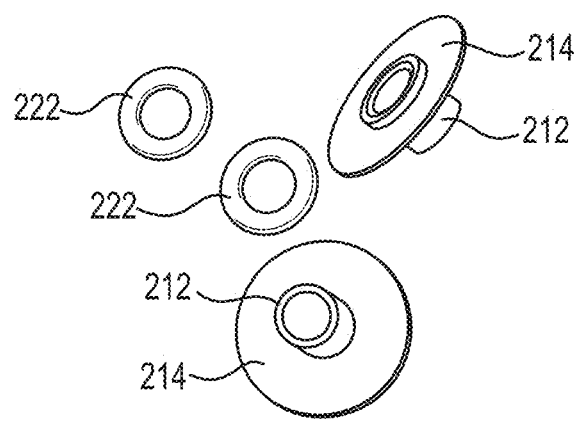
FIG. 9B is a close-up perspective view of a grommet and washer used in a security mechanism according to the embodiment shown in FIGS. 8 and 9A.
Figure 10:
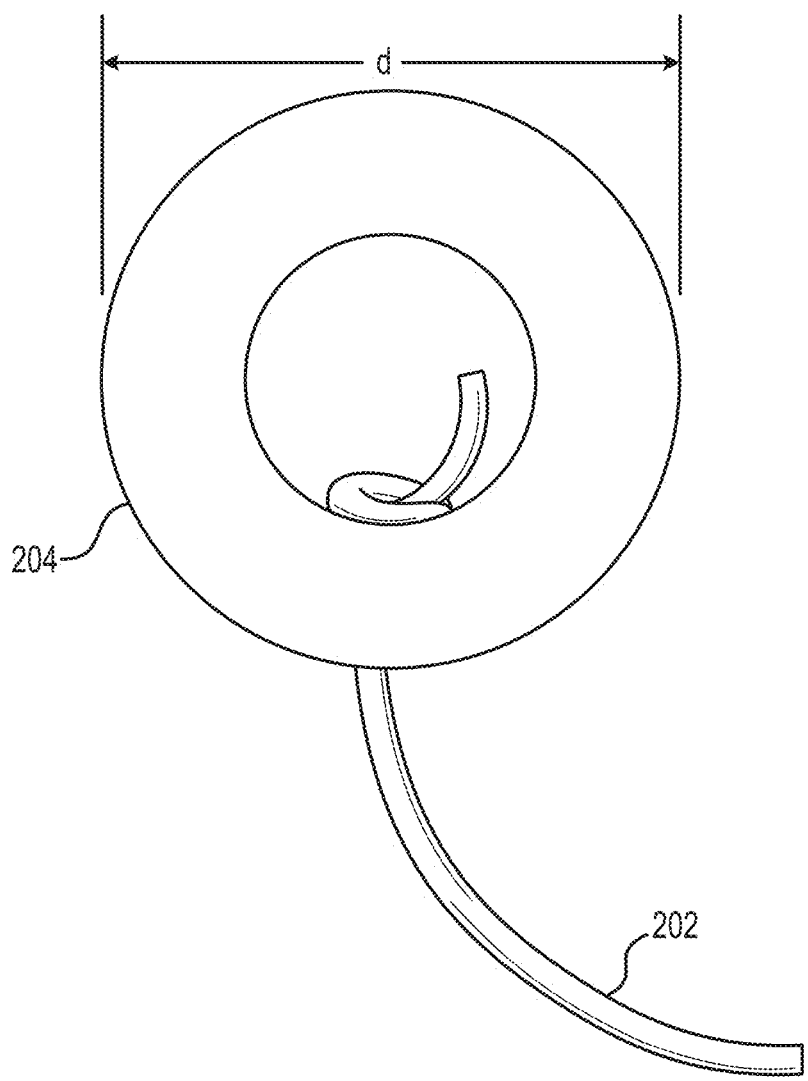
FIG. 10 is a cutaway perspective view of a security mechanism according to an embodiment.
Figure 11:
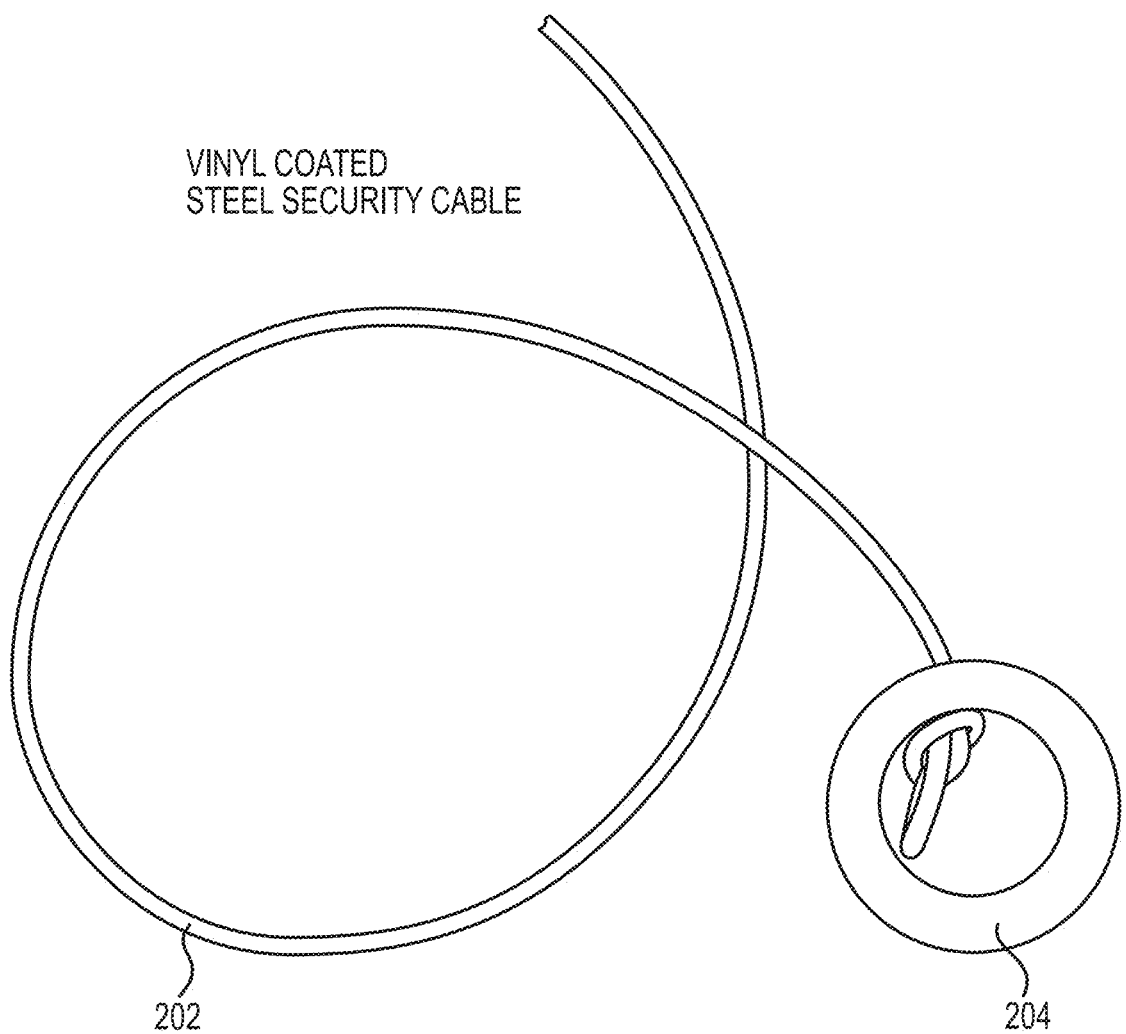
FIG. 11 is a cutaway perspective view of a security mechanism according to the embodiment shown in FIG. 10.

The grommet 212 may be constructed of more than one piece or material. As shown in FIG. 9B, for example the grommet 212 may additionally include one or more washers 222. The washers 222 may be placed adjacent to the grommet 212 and adjacent the front or back side of the panel 10 as appropriate to ensure that the grommet 212 remains firmly in place through the hole 210. FIGS. 10 and 11 depict a distal end of the security feature 200. As shown in FIG. 10, the cable 202 extends to a ring 204, which has diameter d. In alternative embodiments, other shapes than a ring could be used. For example, in alternative embodiments a ball, clip, or any other object that cannot be easily pulled through the closed door of a vehicle can be implemented at the end of the cable 202. The cable 202 may be formed of vinyl coated steel as depicted in FIG. 11. In other embodiments, the cable 202 may be formed of rope, nylon, or other suitable, semi-flexible and durable materials capable of fitting between a door-jamb, or of being placed through a partially opened car window.

With reference to FIGS. 2 and 3, in operation, the panel 10 can be secured to a vehicle by twisting the twist-seal grip 328 around the gib 330. In an example embodiment, turning the twist-seal grip in a clockwise direction may compress the washers 322, 324 around the panel 10 and flatten the vacuum seal cup 326 to the surface of the vehicle. The panel 10 can be removed by twisting the twist-seal grip 328 in the opposite direction. For example, turning the twist-seal grip 328 in a counter-clockwise direction may release the compressive force exerted by the screw tightening suction cup mechanism 320. With reference to FIGS. 4-7, in operation, the panel 10 may be secured to a surface by pushing down on the lever 428 to compress and seal the vacuum seal cup 426 to a vehicle surface. The panel 10 may be removed by pulling the lever 428 up to decompress the vacuum seal cup 426 and release the lever tightening suction cup 420 to remove the panel 10 from the surface of the vehicle.

As one of skill in the art will recognize from the combined description of FIGS. 8-11, a user can deter removal of the panel 10 from the proximity of the vehicle using the security feature 200. When the security feature 200 is engaged, a door or window of the vehicle would have to be opened before the panel 10 could be completely disengaged from the vehicle. Therefore, a user is very unlikely to lose the panel 10 from theft, tampering, or other impact causing its removal.

In operation, for example, the panel 10 may be adhered onto side of the vehicle by first placing the cable 202 and the ring 204 or other anchor, as described above, inside of slightly opened vehicle door 30, and closing the door 30 over the cable 202. The panel 10 can then be applied to a vehicle by placing one portion of the panel 10 against the vehicle at an optimally desired position and tightening the suction cup mechanisms 320, 420 as described above. When thus installed, if the panel is removed from the vehicle without opening the car door 30, the cable 202 will be pulled taut, and the ring 204 or other anchor can be prevented from exiting the car by the closed door 30 or window. Therefore, the panel 10 remains at least partially attached to the vehicle until the car door 30 or window is opened. In alternative embodiments, the cable 202 could be placed through other portions of the vehicle, such as the trunk or a sunroof.

Test Data

In testing such suction cups, it is found that a 2-inch outer diameter (push-and-seal) suction cup with depth of cup of ¼ inch, made of rubber or of pliable vinyl material utilized with such door dent protection devices, without bearing weight, will adhere to a smooth, clean, flat shower tile for an average of 72 hours if not disturbed. With bearing weight of 1 pound and with no other support to the suction cup, it is found to fail and fall off within up to 1 hour.

In testing such suction cup on a motor vehicle, the same 2-inch outer diameter single conventional suction cup with depth of cup of ¼ inch, placed onto the side of a clean, slightly curved contour of a motor vehicle surface, without bearing weight, is found to retain its seal for an average of 35 minutes if undisturbed. With slight disturbance to the suction cup after 10 minutes, such as brushing against the suction cup with 1 pound of side-pressure, the cup has minimal strength causing it to fail and fall off. With bearing weight of 1 pound, the same suction cup, undisturbed, is found to fail within up to 25 minutes. If at any time the 1-pound weight-bearing cup is disturbed the suction cup immediately fails and falls off the vehicle.

Testing was performed on a dent protection device with three of the aforementioned 2-inch outer diameter conventional suction cups, the device having dimensions of 8"×30"×½" thickness and weighing 1.75 pounds. If left undisturbed on a clean, flat vehicle surface, one of the three suction cups failed within 20 minutes, and two other suction cups failed within 40 minutes, causing the device to fall off of the vehicle. This inability to firmly hold is compounded by disturbance to the device, such as impacts from adjacent car doors or manually disturbing the protection device by lightly brushing against it.

The test of a single suction cup, specific to testing on a motor vehicle, was also performed using a single 3-inch outer diameter conventional suction cup with a depth of ¼ inch. The suction cup was made of soft rubber or pliable vinyl material. The larger suction cup does not provide significant improvement to results, increasing the length of time the cup holds in motor vehicle tests with 2-inch outer diameter, ¼ inch depth suction cup by 10% or less. If at any time the 3-inch suction cup, bearing 1-pound weight, was disturbed, i.e., slightly brushed against with 1 pound of side-pressure, it immediately fails and falls off the vehicle 75% of the time in tests performed.

Studies were also performed using a single 3-inch outer diameter conventional suction cup made of soft rubber or pliable vinyl material, having greater depth of cup measuring ½ inch, intended to provide stronger hold to a vehicle. The studies found that such 3-inch diameter, ½ inch depth suction cup does not provide significant improvement to results, increasing the length of time the cup holds in the above-mentioned motor vehicle tests using the 2-inch outer diameter, ¼ inch depth suction cup by 30% or less. This 3-inch outer diameter, ½ inch depth standard push-and-seal suction cup is found to hold 1 pound of weight for an average of only 33 minutes before losing its grip and failing. If bearing 1-pound weight and slightly disturbed, i.e., brushed against with 1 pound of side-pressure, this suction cup also failed to maintain its seal and immediately fell off the vehicle in 50% of the tests performed.

The aforementioned suction cup tests on a motor vehicle were performed in mild climate conditions of 75 degrees. It is found that colder temps under 25 degrees, or in wind conditions such as >20 miles per hour, and/or with dust buildup on the vehicle surface can decrease the length of time the aforementioned suction cup will hold by 50%. Table 1 below summarizes the test results.

| Conventional Suction Cup | Vehicle hold time, no weight, undisturbed | Vehicle hold time, no weight, disturbed (1 lb pressure/horizontal) | Vehicle hold time, 1 lb weight bearing, undisturbed | Vehicle hold time, 1 lb weight bearing, disturbed (1 lb pressure/horizontal) |
|---|---|---|---|---|
| 2" outer diameter, ¼" depth; standard push-and-seal suction cup | 35 minutes avg | 10 minutes avg | 25 minutes avg | 0 minutes |
| 3" outer diameter, ¼" depth; standard push-and-seal suction cup | 39 minutes avg | 11 minutes avg | 28 minutes avg | 0 minutes; 75% |
| 3" outer diameter, ½" depth; standard push-and-seal suction cup | 46 minutes avg | 13 minutes avg | 33 minutes avg | 0 minutes; 50% |

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A vehicle body protection device including:
   a panel formed of a conformable, foamed polymeric material with a front side and a back side, the panel defining a plurality of holes;
   a plurality of suction cups, each of the plurality of suction cups extending through a corresponding one of the plurality of holes such that each suction cup of the plurality of suction cups is primarily protruding from the back side of the panel;
   one or more washers affixed on the front side of the panel at each of the plurality of holes and circumscribing a portion of the corresponding suction cup thereof; and
   a lever tightening mechanism comprising a push lever coupled to each one of the plurality of suction cups adjacent to the front side of the panel, wherein the push lever is mechanically coupled to the suction cup such that manipulation of the lever is configured to selectively form a vacuum seal between the suction cup and a surface adjacent to the back side of the panel.

2. The vehicle body protection device of claim 1, further comprising one of one or more secondary washers affixed on the front side of the panel over each of the one or more holes.

3. The vehicle body protection device of claim 1, further comprising one of one or more secondary washers affixed on the back side of the panel over each of the one or more holes.

4. The vehicle body protection device of claim 1, wherein the panel comprises a shape corresponding to a contour of a vehicle.

5. The vehicle body protection device of claim 1, wherein the panel is sufficiently flexible to match a contour of a vehicle.

6. The vehicle body protection device of claim 1, wherein the panel comprises two sub-panels each extending along a respective primary length, and wherein each of the two sub-panels are mechanically coupled to one another by at least one fixed hinge such that the primary length of a first panel of the two sub-panels is parallel to the primary length of a second panel of the two sub-panels when the at least one fixed hinge is in either an open position or a closed position.

7. The vehicle body protection device of claim 6, wherein the two sub-panels are each configured to correspond to a portion of a contour of a vehicle.

8. The vehicle body protection device of claim 1, further comprising:
   a cord having a proximal end and a distal end, wherein the cord is affixed to the panel at the proximal end; and
   an anchor affixed to the cord at the distal end.

9. The vehicle body protection device of claim 8, wherein the cord is configured to fit between a door and a doorjamb of a vehicle, and wherein the anchor is not configured to fit between the door and the doorjamb of the vehicle.

10. The vehicle body protection device of claim 1, wherein the foamed polymeric body comprises ethylene vinyl acetate (EVA).

11. The vehicle body protection device of claim 1, wherein the one or more washers comprise one of nylon or foamed polymeric material.

12. The vehicle body protection device of claim 2, wherein the one or more secondary washers comprise one of nylon or foamed polymeric material.

13. The vehicle body protection device of claim 3, wherein the one or more secondary washers comprise one of metals, plastics, or silicones.

14. The vehicle body protection device of claim 1, wherein the panel has a height of at least 8 inches.

15. The vehicle body protection device of claim 1, wherein the panel has a width of at least 46 inches.

16. A vehicle body protection device including:
   a panel formed of a conformable, foamed polymeric material with a front side and a back side, the panel defining a plurality of holes;
   a plurality of screw tightening suction cup mechanisms, each of the screw tightening suction cup mechanisms extending through a corresponding one of the plurality of holes and comprising a gib coupled to a twist-seal grip on the front side of the panel and a suction cup on the back side of the panel, the gib having a screw-threaded pattern;
   one or more first washers affixed on the front side of the panel at each of the plurality of holes and circumscribing a portion of the corresponding gib thereof;
   one or more second washers affixed on the back side of the panel at each of the plurality of holes and circumscribing a portion of the corresponding gib thereof; and
   wherein manipulation of the twist-seal grip along the gib is configured to selectively form a vacuum seal between the suction cup and a surface adjacent to the back side of the panel.

17. The vehicle body protection device of claim 16, further comprising:
   one or more third washers affixed on the back side of the panel at each of the plurality of holes and circumscribing a portion of the corresponding gib thereof such that the one or more third washers are adjacent to the panel.

18. The vehicle body protection device of claim 16, wherein the one or more first washers are comprised of a polymeric material capable of providing compressive support to the screw tightening suction cup mechanism.

19. The vehicle body protection device of claim 16, wherein the one or more second washers are comprised of a high density foam polymer.

20. The vehicle body protection device of claim 19, wherein the high density foam polymer is ethylene vinyl acetate.

* * * * *